UNITED STATES PATENT OFFICE.

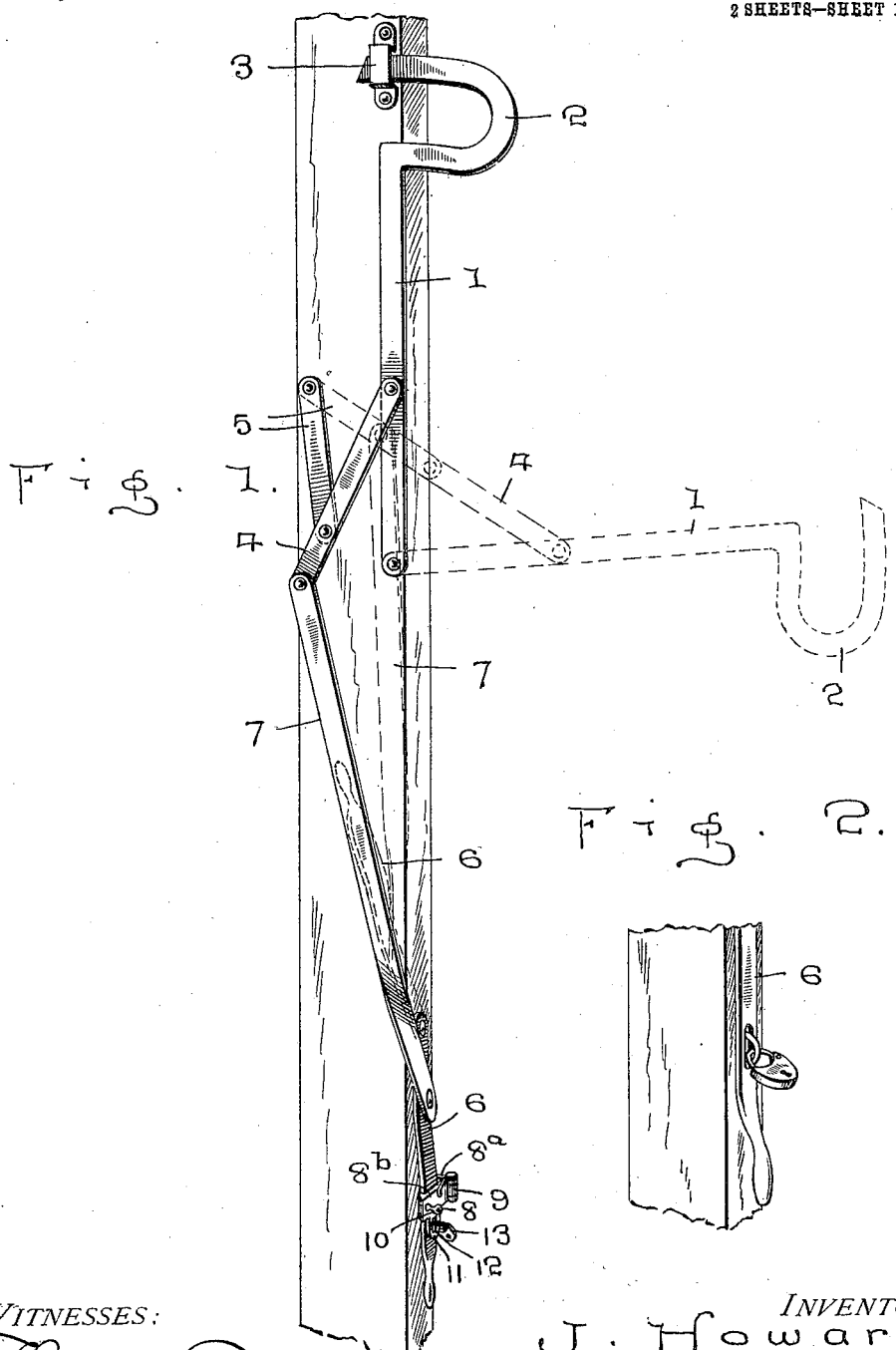

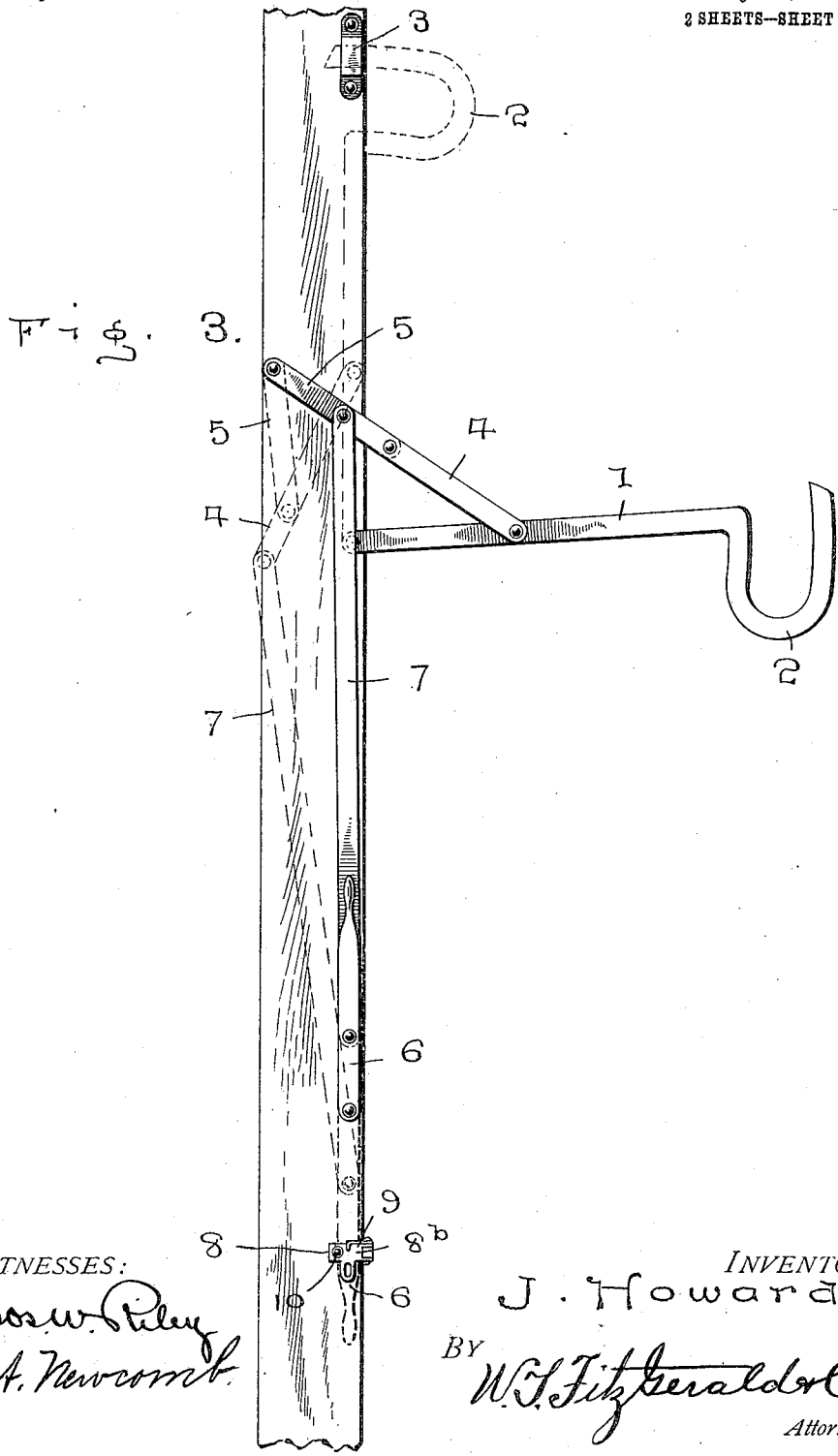

JOHN HOWARD, OF LORETTO, NEBRASKA.

HARNESS-SUSPENDING MEANS.

No. 922,904.  Specification of Letters Patent.  Patented May 25, 1909.

Application filed November 25, 1908. Serial No. 464,355.

*To all whom it may concern:*

Be it known that I, JOHN HOWARD, a citizen of the United States, residing at Loretto, in the county of Boone and State of Nebraska, have invented certain new and useful Improvements in Harness - Suspending Means; and I do hereby declare the following to be a full, clear, and exact description of the invention, such as will enable others skilled in the art to which it appertains to make and use the same.

My invention relates to new and useful improvements in means especially designed for the suspension of harness, as in a stall, harness room, livery barn, or other point, in elevated position and my object is to effect said purpose as against the harness being knocked down by the rubbing action of the horse, or being stolen.

A further object is to carry out the aforesaid ends in a simple, effective and economical manner.

Other objects and advantages will be hereinafter referred to and more particularly pointed out in the claims.

In the accompanying drawings which are made a part of this application, Figure 1 is a perspective view of my invention in full lines in its elevated or effective position and in dotted lines in its lowered or depressed position. Fig. 2 is a detail sectional view of a modified form of means for locking the device in its elevated position and, Fig. 3 is a modification of the invention with the parts in reversed position to that shown in Fig. 1.

In practicing my invention, I provide a suspending bar or member 1, the inner end of which is pivoted to one of the uprights of a horse's stall, or other desired points, the opposite end of said bar or member being formed with an open loop 2 having its entrance opening facing upwardly when in its depressed position. For the reception of the upper end of the U-shaped or looped portion of the bar member 1, a keeper 3 is fixed to said upright member of the stall.

The suspending bar 1 has connected thereto a short distance from its inner pivoted end, a link 4 having connection with an additional link 5 pivoted to the upright member of the stall. To said link 4 is also connected a hand lever 6, the connection therebetween being effected by means of a third link or member 7 pivotally connected to the link 4 and lever 6, the connection between the link 4 and the member 7 being effected at their inner and upper ends, respectively, the connection between the member 7 and the lever 6 being intermediate of the fulcrum and outer end of said lever, whereby as said lever is depressed and suitably secured, a locking action will be provided between said parts and said bar or member 1 for the retention of the latter in its keeper member against unauthorized actuation of said parts. It will be noted that the link 7 is bent or twisted so that its lower end is adapted to stand in a plane at right angles with its upper portion, thus being presented edge-wise to its support and that the lever 6 is pivoted to said edge of the support.

A two-part latch member 8 is adapted for engagement with the lever 6 for its retention in effective position, said latch being composed of two members 8$^a$ and 8$^b$, one member being fixed laterally to its support and the other member being hinged or pivoted thereto and held under spring pressure as at 9, it also having a projecting finger or stud 10 for conveniently releasing the lever 6 therefrom when desired. Said spring-pressed latch member has a lateral or edge-wise extension 11 provided with a slot 12 adapted to receive the shackle of a padlock 13, said padlock having its shackle also passed through an aperture in the lever 6, thus providing for connecting the spring-pressed latch member and the lever 6 together in locked position and whereby the harness when suspended by the hook or loop 2 of the part 1, may be secured in position, as above indicated, from unauthorized removal or such removal unless portions of the harness be mutilated or severed, as will be readily appreciated.

It will be noted that as the harness is removed from the horse or other animal, it is suspended in the hooked or loop-shaped portion 2 of the bar member 1, the parts then being in the position indicated in dotted lines in the figure, after which by suitably manipulating the lever, said member 1 is elevated into the full lined position with its hook or loop portion received by the keeper 3, thus effecting the suspending of the harness out of the way of the rubbing action of the horse or other animal. As previously noted, the lever 6 is now suitably locked in position, whereby the unauthorized or surreptitious removal of the harness is prevented as desired to guard against the same being stolen.

In the modification as disclosed by Fig. 3, the link 7 is alined throughout its length in the same plane and together with the lever 6, is arranged and pivoted laterally upon its support instead of upon one edge of said support as described in connection with the above arrangement of said parts.

What I claim is:

1. A device of the character described, comprising a pivoted arm or bar having a looped or U-shaped terminal for suspending purposes, a keeper for receiving the free end of said U-shaped terminal when in elevated position, a manually actuated lever and a plurality of links, one pivoted to said bar and to the second one of said links, said second link being connected to said lever, a third link being connected to the first referred to link intermediate of the pivotal connections between the first referred to link and its pivotal connection with said suspending bar and said lever.

2. A device of the character described, comprising a pivoted bar or arm having a U-shaped or hooked terminal, a keeper for receiving the free end of said terminal, a manually actuated lever, a link pivotally connected to said arm, a second link pivoted to the aforesaid link and to said lever and a third link pivotally connected to the first-referred to link intermediate of the pivotal connections between the latter and said link and securing means for said lever.

3. A device of the character described, comprising a pivoted bar or member having a looped or U-shaped terminal, a keeper for the reception of the free end of said looped or U-shaped portion, a manually actuated lever, a link pivoted to said bar, a second link pivoted to the first-referred-to link and to said lever intermediate of the ends of said lever, and a third link pivotally connected to the first-referred-to link intermediate of the pivotal points of connection between said bar and said second link said lever being adapted to be retained in place by a latch or lock.

4. A device of the character described, having a manually actuated lever and a fastening device comprising two hinged-together members, one having spring-exerted pressure applied thereto and adapted to engage said lever at a lateral edge thereof, said spring-pressed member having a slotted lateral extension said lever being adapted to be retained in place by means of a lock.

In testimony whereof I have signed my name to this specification in the presence of two subscribing witnesses.

JOHN HOWARD.

Witnesses:
MICHAEL V. RUDDY,
GEORGE W. WILLIAMS.